United States Patent
Komaki et al.

(10) Patent No.: US 6,689,415 B2
(45) Date of Patent: Feb. 10, 2004

(54) METHOD AND APPARATUS FOR PREPARING OPTICAL INFORMATION MEDIUM

(75) Inventors: Tsuyoshi Komaki, Chuo-ku (JP); Hideki Hirata, Chuo-ku (JP); Kenji Yamaga, Chuo-ku (JP)

(73) Assignee: TDK Corporation, Tokyo (JP)

( * ) Notice: Subject to any disclaimer, the term of this patent is extended or adjusted under 35 U.S.C. 154(b) by 91 days.

(21) Appl. No.: 09/875,139

(22) Filed: Jun. 7, 2001

(65) Prior Publication Data

US 2001/0052320 A1 Dec. 20, 2001

(30) Foreign Application Priority Data

Jun. 9, 2000 (JP) ........................................ 2000-174540

(51) Int. Cl.$^7$ ............................... B05D 1/32; B05D 3/12
(52) U.S. Cl. ...................... 427/162; 427/240; 427/282; 427/407.1; 427/425; 118/52; 118/320; 118/504; 118/505
(58) Field of Search .................................. 427/240, 425, 427/162, 164, 282, 407.1; 118/52, 320, 504, 505

(56) References Cited

U.S. PATENT DOCUMENTS

| | | | | |
|---|---|---|---|---|
| 5,980,985 A | * | 11/1999 | Kikuchi | 427/240 |
| 6,077,349 A | * | 6/2000 | Kikuchi | 118/52 |
| 2001/0053118 A1 | * | 12/2001 | Yoshinari et al. | 369/275.2 |
| 2001/0053121 A1 | * | 12/2001 | Komaki et al. | 369/283 |
| 2002/0009045 A1 | * | 1/2002 | Tsukagoshi et al. | 369/275.3 |
| 2002/0021656 A1 | * | 2/2002 | Tsukagoshi et al. | 369/275.3 |
| 2002/0036979 A1 | * | 3/2002 | Hayashida et al. | 369/286 |

FOREIGN PATENT DOCUMENTS

| | | |
|---|---|---|
| JP | 10-249264 | 9/1998 |
| JP | 10-289489 | 10/1998 |
| JP | 10-320850 | 12/1998 |
| JP | 11-195250 | 7/1999 |
| JP | 11-195251 | 7/1999 |

* cited by examiner

*Primary Examiner*—Shrive P. Beck
*Assistant Examiner*—Kirsten Crockford Jolley
(74) *Attorney, Agent, or Firm*—Oblon, Spivak, McClelland, Maier & Neustadt, P.C.

(57) ABSTRACT

A method and apparatus is provided for preparing an optical information medium comprising a disk-shaped substrate having a center hole, an information recording layer thereon, and a resin-based light-transmitting layer thereon by which recording/reading laser beam is transmitted. The apparatus includes a rotating table (2) for holding and rotating the substrate (100) having the information recording layer borne thereon, a plug means (3) including a disk member (31) for closing the center hole (101) and an integral support shaft (32), and a nozzle (4) for feeding a coating fluid containing the resin to the outer periphery of the support shaft (32), wherein the coating fluid is flowed from the support shaft to the disk member, then over the substrate, thereby forming the light-transmitting layer having a minimized thickness variation.

1 Claim, 3 Drawing Sheets

METHOD AND APPARATUS FOR PREPARING OPTICAL INFORMATION MEDIUM

This invention relates to a method and apparatus for preparing optical information media such as read-only optical disks and optical recording disks.

BACKGROUND OF THE INVENTION

To record and store a vast quantity of information as typified by moving image information, advanced optical information media such as read-only optical disks and optical recording disks are required to increase their recording density for increasing the capacity. To meet such a demand, engineers have been engaged in the research and development works targeting a higher recording density.

One such approach relating to digital versatile disks (DVD) is to shorten the wavelength of a recording/reading laser beam and increase the numerical aperture (NA) of a recording/reading optical system objective lens, thereby reducing the spot diameter of the recording/reading laser beam. As compared with CD, DVD is successful in achieving a recording capacity of 6 to 8 folds (typically 4.7 GB/side) by changing the recording/reading wavelength from 780 nm to 650 nm and the NA from 0.45 to 0.6.

Increasing the NA, however, leads to a reduced tilt margin. The tilt margin is a permissible tilt of an optical recording medium relative to an optical system, which depends on the NA. The tilt margin is in proportion to $$\lambda/(d \cdot NA^3)$$

wherein $\lambda$ denotes the wavelength of Recording/reading beam and "d" denotes the thickness of a transparent substrate the Recording/reading beam enters. If the optical recording medium is inclined or tilted relative to the laser beam, a wavefront aberration (or coma) occurs. The coefficient of wavefront aberration is represented by $$(\tfrac{1}{2}) \cdot d \cdot \{n^2 \cdot \sin\theta \cdot \cos\theta\} \cdot NA^3/(n^2-\sin^2\theta)^{-5/2}$$

wherein n denotes the refractive index of the substrate and $\theta$ is a tilt angle. It is appreciated from these formulae that the tilt margin may be increased and the occurrence of comatic aberration be suppressed by reducing the thickness "d" of the substrate. In fact, the DVD design is such that a tilt margin is secured by reducing the thickness of the substrate to about one half (about 0.6 mm) of the thickness (about 1.2 mm) of the CD substrate.

To record moving images of better quality for a longer period of time, there has been proposed a structure allowing for use of a thinner substrate. In this structure, a substrate of an ordinary thickness is used as a supporting substrate for maintaining rigidity, pits or a recording layer is formed on the surface of the supporting substrate, and a light-transmitting layer of about 0.1 mm thick is formed thereon as a thin substrate. Recording/reading beam reaches the pits or recording layer through the light-transmitting layer. This structure can achieve a higher recording density due to a greater NA because the substrate can be made extremely thin as compared with the prior art. Media having such structure are disclosed in JP-A 10-320859 and 11-120613.

The provision of a light-transmitting layer of approximately 0.1 mm thick allows for use of an objective lens having a large numerical aperture NA, say about 0.85.

The light-transmitting layer of approximately 0.1 mm thick can be formed, for example, by a spin coating technique. The spin coating technique generally involves feeding a resin onto the surface of a disk substrate secured on a rotating table, and rotating the disk substrate for spreading the resin by a centrifugal force. Since the disk substrate is formed with a center hole which is utilized for mounting the disk on a drive, the resin cannot be fed to the center of rotation (or the center of the disk substrate), but to an annular band equidistantly spaced apart from the center of rotation. As the position of resin feed is spaced apart from the center of rotation, the resulting coating or light-transmitting layer has a greater thickness variation in a radial direction.

To reduce the radial thickness variation of the light-transmitting layer, several proposals were made to close the center hole of the disk substrate with suitable plug means such as a plate member, disk member, plug or cap so that the resin can be fed near the center of the plug means, that is, the center of rotation. See JP-A 10-320850, 10-249264, 10-289489, 11-195250, and 11-195251.

However, the techniques of JP-A 10-320850, 10-249264, and 11-195250 are difficult to practice in the industry because it is not described how to remove the plug means such as the plate member or cap at the end of spin coating.

In contrast, JP-A 10-289489 describes that at the end of spin coating, the plug means such as the disk member is removed by punching out or magnetic attraction using an electromagnet. However, the punching step or the removal by magnetic attraction is a cumbersome operation. The plug means is removed at a high acceleration, causing a disturbance to the resin coating.

The above-referenced JP-A 11-195251 describes a plug means of the structure having a circular cap and an integral support at the center thereof. The support allegedly facilitates attachment/detachment and alignment of the plug means. The support described therein is a hollow cylinder having at least one discharge port or consists of a plurality of rods. Once a resin is introduced into the interior of the hollow cylinder or the region circumscribed by the rods, the disk substrate is rotated together with the plug means whereby a resin layer is formed on the disk substrate. Finally the plug means can be readily removed.

With this plug means used, spin coating is carried out by causing the resin to flow out of the discharge port in the hollow cylinder or the gaps between the rods. Therefore, the resin is retained or dammed by the support wall (region other than the discharge port) or the rods. The once dammed resin can flash over the disk substrate at incidental timing, frequently forming asperities on the coating. Also the side of the plug means to be in contact with the resin has a complex shape and a large contact area, which is inconvenient at washing the plug means. If some resin is left on the surface of the plug means, the coating frequently becomes uneven. Table 1 of the above-referenced JP-A 11-195251 reports the thickness variations of the coating formed when the outer diameter of the hollow cylinder ranges from 4 mm to 16 mm. It is evident from the test results that the thickness variation of the coating depends on the outer diameter of the hollow cylinder. The larger the outer diameter, the greater becomes the thickness variation. More specifically, even if the resin is fed to the interior of the hollow cylinder, the coating start position is not coincident with the center of rotation, but the outer perimeter of the hollow cylinder. With the relatively high viscosity of the resin taken into account, it is difficult to reduce the outer diameter of the hollow cylinder below 4 mm. The method of this patent is thus very difficult to minimize the thickness variation of the resin coating.

SUMMARY OF THE INVENTION

An object of the invention is to provide a method and apparatus for preparing an optical information medium comprising a disk-shaped supporting substrate, an information recording layer thereon, and a resin-based light-transmitting layer thereon by which recording/reading laser beam is transmitted, the method and apparatus being capable of minimizing the thickness variation of the light-transmitting layer without significant complication of the method and apparatus.

In one aspect, the invention provides an apparatus for preparing an optical information medium which comprises a disk-shaped supporting substrate having a center hole, an information recording layer thereon, and a resin-based light-transmitting layer on the information recording layer by which recording/reading laser beam is transmitted. The apparatus includes a rotating table for holding and rotating the supporting substrate having the information recording layer borne thereon. A plug means for closing the center hole includes a disk member for closing the center hole and an integral support shaft extending from the disk member at the center thereof. A feed means is provided for feeding a coating fluid containing the resin to the outer periphery of the support shaft.

In one preferred embodiment, at least a portion of the support shaft is a frustoconical portion whose diameter gradually decreases toward the disk member.

In another aspect, the invention provides a method for preparing the optical information medium defined above using the apparatus defined above. The method involves the steps of mounting the supporting substrate having the information recording layer borne thereon on the rotating table; closing the center hole of the supporting substrate with the disk member of the plug means; feeding the coating fluid from the feed means to the outer periphery of the support shaft, then onto the disk member of the plug means; rotating the supporting substrate together with the plug means, whereby the coating fluid is spread from the disk member over the supporting substrate to form a resin layer; and curing the resin layer into a light-transmitting layer.

The preparation apparatus of the invention includes, as shown in FIGS. 1 and 3, a rotating table 2 for holding and rotating a disk substrate 100 (supporting substrate having an information recording layer borne thereon) having a center hole 101, plug means 3 for closing the center hole 101, and feed means in the form of a nozzle 4 for feeding a coating fluid 5 containing the resin. The plug means 3 includes a disk member 31 for closing the center hole 101 and an integral support shaft 32 extending from the disk member 31 at the center thereof. The nozzle 4 feeds the coating fluid 5 to the outer periphery of the support shaft 32.

The provision of the support shaft 32 in the plug means 3 facilitates the handling of the plug means 3 during the medium preparation process and especially, the removal of the plug means 3 at the end of spin coating.

As previously discussed, JP-A 11-195251 describes a plug means of the structure having a circular cap and an integral support in the form of a hollow cylinder or a plurality of rods. The plug means used in the present invention has the following advantages over the plug means of this patent reference.

In JP-A 11-195251, the resin is dammed by the support wall or rods, which can cause thickness variations to the coating. In contrast, according to the present invention, the coating fluid is fed to the outer periphery of the support shaft, followed by spin coating. This sequence minimizes the thickness variation of the coating. Since the resin is applied to the outer periphery of the support shaft, washing of the plug means is easy as compared with the plug means of JP-A 11-195251. Since a coating fluid having a relatively high viscosity is fed to the interior of the hollow cylindrical support in JP-A 11-195251, the outer diameter of the support cannot be reduced below the limit necessary to maintain the coating fluid flowable. As a result, the coating start position is located relatively far from the center of rotation. In contrast, the present invention allows the outer diameter of the support shaft to be significantly reduced, which also contributes to the minimization of thickness variation of the coating.

BRIEF DESCRIPTION OF THE DRAWINGS

The above and other objects, features and advantages of the invention will be better understood by reading the following description taken in conjunction with the accompanying drawings.

DESCRIPTION OF THE PREFERRED EMBODIMENT

Figure 8:
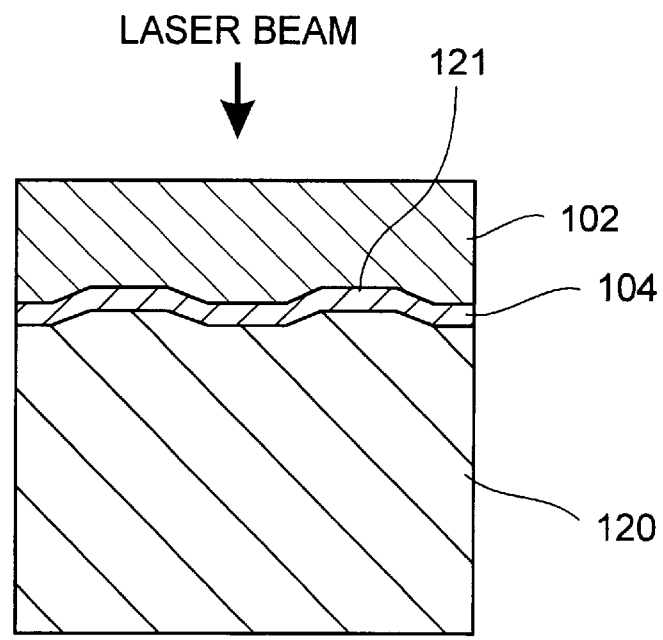
FIG. 8 is a fragmentary cross-sectional view of an optical information medium.

Referring to FIG. 8, there is schematically illustrated one exemplary construction of an optical information medium to be produced by the invention. The optical information medium illustrated is a recording medium comprising a supporting substrate 120, an information recording layer 104 on the supporting substrate 120, and a light-transmitting layer 102 on the recording layer 104. Recording/reading laser beam reaches the information recording layer 104 through the light-transmitting layer 102.

The invention is applicable to any type of recording layer. Specifically, the invention is applicable to phase change recording media, pit formation type recording media, and magnetooptical recording media, for example. In general, additional layers such as a dielectric layer and a reflective layer are provided on at least one side of the recording layer for the purposes of protecting the recording layer and achieving optical effects, although they are omitted in FIG. 8. The invention is not limited to the writable type, and may also be applicable to the read-only type. In the latter case, the information recording layer is constructed by a row of pits formed integrally in the supporting substrate 120. In this sense, the information recording layer is also referred to as information recording surface.

Now the method of forming the light-transmitting layer is described.

Figure 1:
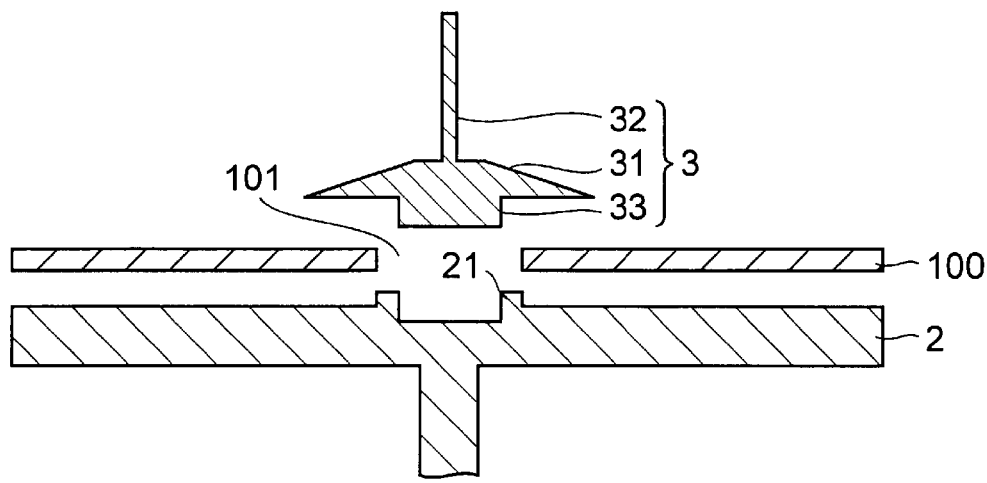
FIGS. 1 to 6 are cross-sectional views illustrating successive steps in a process of forming a light-transmitting layer.
Figure 2:
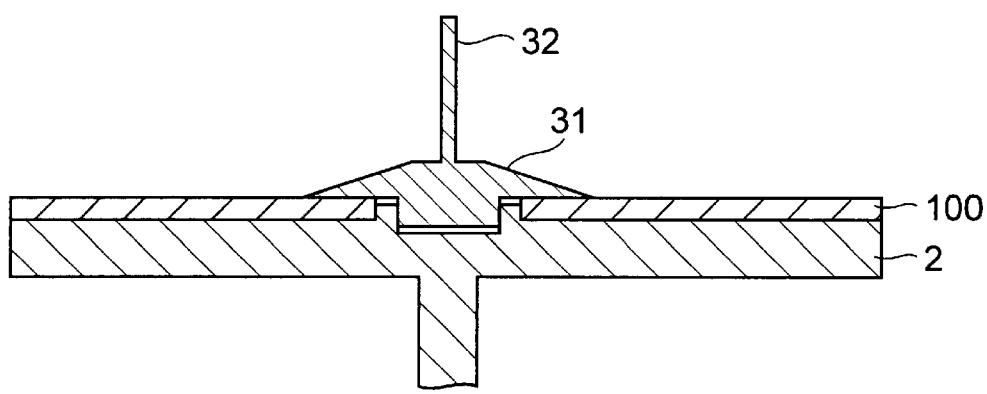

As shown in FIGS. 1 and 2, a disk substrate 100 is rested on a rotating table 2. The disk substrate 100 is a supporting substrate having an information recording layer borne thereon and has a center hole 101. The disk substrate 100 is secured by tightly fitting the center hole 101 on an annular rim 21 of the rotating table 2. FIGS. 1 and 2 are cross-sectional views showing only planes appearing in cross section, with any backward portion being omitted. This rule of illustration is the same throughout the cross-sectional views.

Next, the center hole 101 is closed with a plug means 3. The plug means 3 includes a disk member 31 for closing the center hole 101, an integral support shaft 32 extending upright from the disk member 31 at the center thereof, and an integral back projection 33 extending downward from the disk member 31 on the side facing the center hole. By engaging the projection 33 into the annular rim 21 of the rotating table 2, the plug means 3 is secured to the rotating table 2 and aligned with the disk substrate 100. It is not critical how to secure the disk substrate 100 and the plug means 3 to the rotating table 2. In one alternative securing procedure, the disk substrate 100 is first engaged with the plug means 3 which is, in turn, engaged with the rotating table 2.

Figure 3:
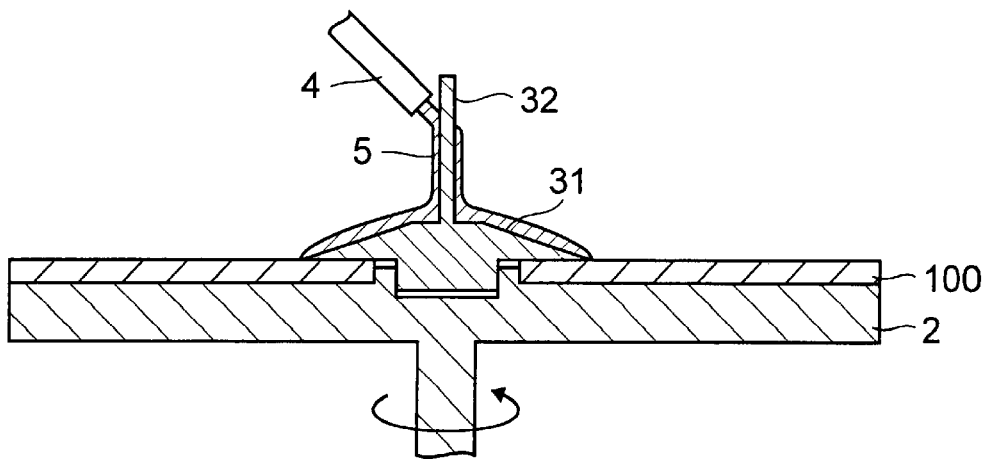

Next, a coating fluid 5 in the form of a resin or resin solution is injected from a nozzle 4 to the outer periphery of the support shaft 32 as shown in FIG. 3. At this point, the rotating table 2 is rotated at a relatively low speed, preferably about 20 to 100 rpm, so that the coating fluid may be uniformly spread over the disk member 31. The resin used herein is not critical although it is typically selected from energy radiation curable resins and thermosetting resins. Of these, energy radiation curable resins, especially UV curable resins are preferred.

Figure 4:
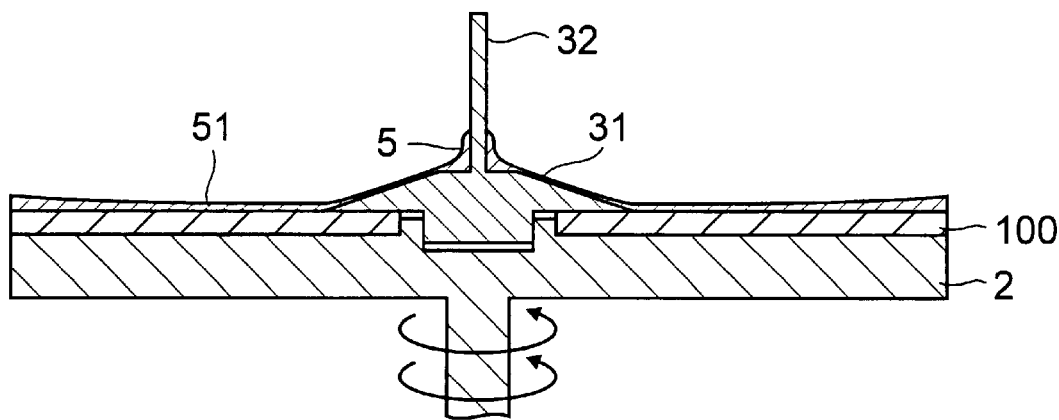

Next, as shown in FIG. 4, the rotating table 2 is rotated at a relatively high speed to cast the coating fluid 5 over the disk substrate 100 for forming a resin layer 51 on the disk substrate 100.

The spin coating conditions of the coating fluid are not critical. It is known that in the spin coating technique using the same conditions other than the viscosity of the coating fluid, the thickness of the coating is theoretically in proportion to the square root of the viscosity of the coating fluid. On the other hand, the higher the rotational speed, and the longer the rotating time, the thinner becomes the coating. Therefore, the rotational speed (rpm) and rotating time during the spin coating are determined as appropriate depending on the thickness of the resin layer 51 to be formed and the viscosity of the coating fluid. When it is desired to form a light-transmitting layer having a thickness of about 30 to 300 µm, it is recommended that the viscosity of the coating fluid be selected in the range of about 100 to 100,000 centipoise, the rotational speed be selected in the range of about 500 to 6,000 rpm, and the rotating time be selected in the range of about 2 to 10 seconds.

Figure 5:
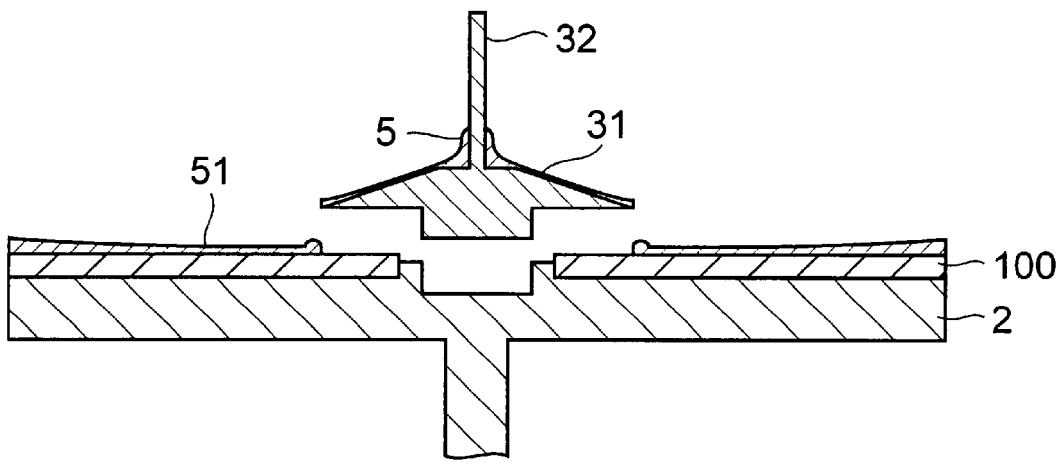
Figure 6:
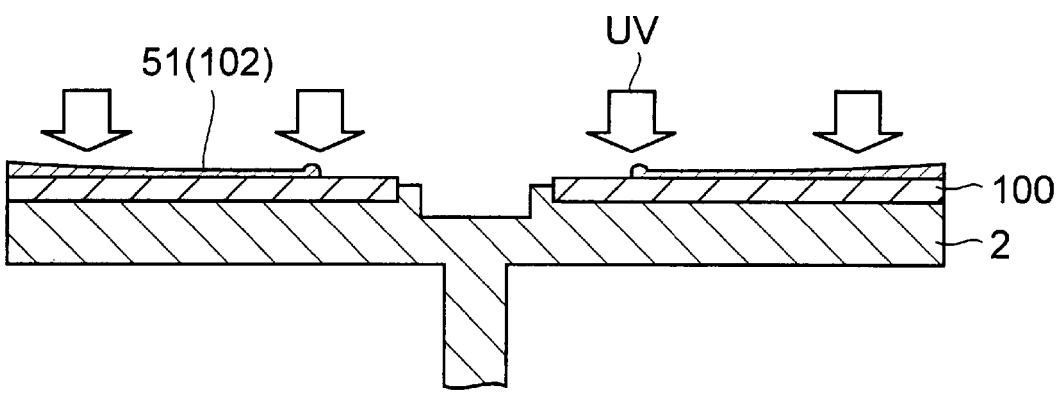

Next, as shown in FIG. 5, the plug means 3 is detached from the disk substrate 100 and the table 2. It is noted that the disk substrate 100 may be either stationary or being rotated when the plug means 3 is detached from the disk substrate 100. In case the coating fluid contains a UV curable resin, the resin layer 51 is exposed to UV radiation as shown in FIG. 6 whereby the resin layer 51 is cured into a light-transmitting layer 102. In FIG. 6, UV radiation is irradiated to the resin layer 51 on the rotating table 2. In an alternative embodiment, the substrate 100 is transferred from the rotating table 2 to a curing station where curing is carried out.

It is noted that the plug means 3 may be detached from the disk substrate 100 after the resin layer 51 is cured. However, the removal of the plug means 3 following the curing often gives rise to a problem that the resin layer portion on the disk substrate 100 is formed with fins near the boundary with the resin layer portion on the disk member 3, and/or the cured resin can be shattered into fragments which scatter on the disk substrate 100. The order of detaching the plug means 3 and then curing the resin layer 51 is thus preferred.

The construction of the plug means is not critical as long as it has a disk member and a support shaft. Although the plug means 3 is shown in FIG. 1 as having a frustoconical disk member 31 and a columnar support shaft 32, other plug means as illustrated in FIGS. 7A to 7D can also be used.

Figure 7A:
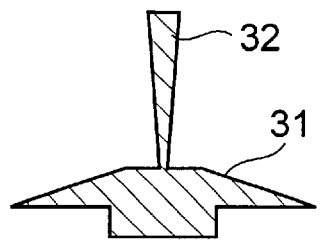
FIGS. 7A to 7D are cross-sectional views illustrating different examples of the plug means.

The plug means shown in FIG. 7A has a disk member 31 and an elongated inverted frustoconical (or tapered) support shaft 32. This plug means allows the coating start position of the coating fluid to be located closer to the center of the disk member 31 for further reducing the thickness variation of the coating. Unlike the support shaft 32 which is thin throughout its length, the tapered support shaft 32 invites only a limited decrease of mechanical strength. When the support shaft 32 is clamped by a chuck or the like, the tapered support shaft 32 is unlikely to come out of the chuck, which is advantageous upon detachment and transportation of the plug means. It is noted that the support shaft 32 need not be tapered throughout its length. The requirement is that at least a portion of the support shaft 32 has a frustoconical shape whose diameter gradually decreases toward the disk member 31, and the diameter of the support shaft does not increase in a region thereof located closer to the disk member than said portion.

Figure 7B:
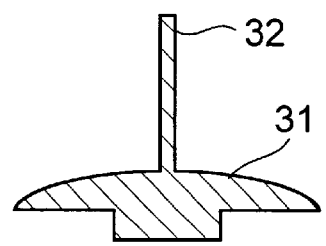
Figure 7C:
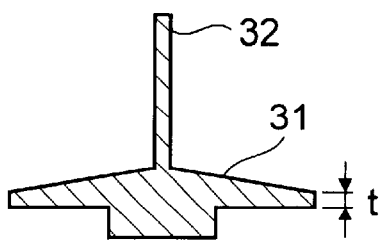
Figure 7D:
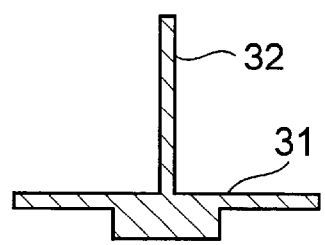

The plug means shown in FIG. 7B has a disk member 31 whose shape is different from FIG. 7A. In order that the coating fluid be uniformly spread over the disk member 31, it is preferred that the thickness of the disk member 31 gradually decrease toward the outer edge. To this end, the upper surface of the disk member 31 over which the coating fluid flows, as viewed in vertical cross section, may be straight as shown in FIG. 7A or curvilinear as shown in FIG. 7B. The outer edge of the disk member is more or less pointed in FIGS. 7A and 7B although the outer edge may have a vertical face as shown in FIG. 7C. The outer edge of the disk member 31 should preferably have a thickness t of 0.4 mm or less. If the outer edge has too large a thickness, the coating fluid may not be smoothly transferred from the disk member to the disk substrate, resulting in the resin layer being unevenly coated. In a further alternative, the disk member 31 has a flat surface or a uniform thickness, preferably within the above range, as shown in FIG. 7D.

In the plug means used herein, the support shaft 32 in proximity to the disk member 31 has a minimum diameter of preferably less than 4 mm, more preferably up to 2 mm. If the diameter of the support shaft 32 in proximity to the disk member 31 is too large, the coating start position is spaced apart from the center of the disk member 31, resulting in the resin layer 51 having a large thickness variation in a radial direction. However, if the diameter of the support shaft 32 in proximity to the disk member 31 is too small, the support shaft 32 becomes mechanically weak. For this reason, the minimum diameter of the support shaft 32 should preferably be at least 0.5 mm, more preferably at least 0.7 mm. The length of the support shaft 32 is not critical and may be determined as appropriate for ease of feed of the coating fluid to the outer periphery of the support shaft and ease of handling as by clamping. An appropriate length is about 5 to 100 mm, more preferably about 10 to 30 mm. If the support shaft 32 is too short, difficulty may arise at feeding the coating fluid to the outer periphery and clamping the shaft. If the support shaft 32 is too long, handling is cumbersome.

The diameter of the disk member 31 should be larger than the diameter of the center hole 101 in the disk substrate 100 and smaller than the inner diameter of the annular information recording layer on the supporting substrate. It is preferred that the diameter of the disk member 31 is at least 4 mm, especially at least 8 mm larger than the diameter of the center hole 101 because the coating fluid 5 can otherwise penetrate below the disk member 31 to contaminate the inner peripheral surface region of the disk substrate 100 circumscribing the center hole 101. Since detachment of the disk member 31 can often cause disturbances to the shape of the resin layer 51 located nearby, it is preferred that the diameter of the disk member 31 is at least 3 mm, especially at least 5 mm smaller than the inner diameter of the annular information recording layer. Although the specific size of the disk member 31 depends on the diameter of the center hole and the inner diameter of the annular information recording layer, the disk member 31 preferably has a diameter in the range of 20 to 40 mm, especially 25 to 38 mm, when the invention is applied to optical disks having a diameter of about 60 to 130 mm.

Any desired material may be used to construct the plug means. A choice may be made among metals, resins and ceramics as well as composite materials thereof. The disk member 31 and the support shaft 32 may be formed of the same material or different materials. Preferably, the plug means is constructed of metals by reasons of mechanical strength, durability and dimensional precision. Useful metals are stainless steel, aluminum and aluminum alloys.

The surface of the plug means 3, especially the entire surface of the disk member 31 should preferably have a lower surface tension than the coating fluid. If the surface of the plug means 3 is least wettable with the coating fluid, it becomes easy to wash coating fluid deposits away from the plug means. The surface tension can be controlled by selecting an appropriate material to construct the plug means. Alternatively and preferably, water and oil repellent treatment such as Teflon® coating is carried out on the region where surface tension is to be reduced.

Now the optical information medium which can be produced by the method and apparatus of the invention is described.

The supporting substrate 120 (FIG. 8) is provided to maintain rigidity for the medium. The supporting substrate generally has a thickness of 0.2 to 1.2 mm, preferably 0.4 to 1.2 mm and may be either transparent or opaque. The supporting substrate 120 is usually constructed of a resin like conventional optical recording media although glass may also be used for the substrate. Grooves 121 are generally formed in optical recording media. Such grooves are obtained by forming grooves in the supporting substrate 120 and transferring the grooves to the layers deposited thereon. The grooves 121 are (depressed) regions located closer to the incident side of recording/reading laser beam, with (raised) regions interposed between adjacent grooves serving as lands.

The light-transmitting layer 102 has a sufficient transparency for laser beam to pass therethrough. The light-transmitting layer preferably has a thickness in the range of 30 to 300 μm. If the light-transmitting layer is thinner than the range, dust and debris depositing thereon can have detrimental optical effects. If the light-transmitting layer is too thick, it may be difficult to achieve a high recording density by an increase of NA.

EXAMPLE

Example 1

A read-only optical disk sample was fabricated as follows.

A disk-shaped supporting substrate having information-bearing pits formed in its surface was molded from polycarbonate to an outer diameter of 120 mm, an inner diameter (center hole diameter) of 15 mm and a thickness of 1.2 mm. On the pit-formed surface of the substrate, a reflective layer of aluminum was deposited by sputtering.

Next, a light-transmitting layer was formed thereon by the inventive method using a plug means. The plug means used was configured as shown in FIG. 1 and included a disk member 31 having a diameter of 38 mm and a support shaft 32 having a diameter of 1 mm and a length of 20 mm, both formed of stainless steel.

While the rotating table was rotated at 60 rpm, a UV curable resin (SD301 by Dainippon Ink & Chemicals, Inc., viscosity 500 centipoise) was fed to the outer periphery of the support shaft 32. Then the rotating table was rotated at 800 rpm for 5 seconds whereby the resin was cast over the surface of the reflective layer to form a resin layer. The plug means was detached from the disk substrate. The resin layer was then exposed to UV radiation for curing into a light-transmitting layer. An optical disk sample was obtained in this way.

In the disk sample region whose radius ranges from 23 mm to 58 mm, corresponding to the information recorded surface, the thickness of the light-transmitting layer was measured using a laser focus displacement meter. The light-transmitting layer had a thickness within the range of 97±2 μm, indicating a minimized radial thickness variation.

Example 2

An optical disk sample was fabricated as in Example 1 except that the UV curable resin was K2009 (by Nippon Kayaku Co., Ltd., viscosity 2,500 centipoise), and spin coating was done at 2,500 rpm for 4 seconds. The sample was measured as in Example 1. The light-transmitting layer had a thickness within the range of 78±2 μm, indicating a minimized radial thickness variation.

Example 3

An optical disk sample was fabricated as in Example 1 except that the plug means illustrated in FIG. 7A was used. In this plug means, the support shaft 32 had a diameter of 0.7 mm at its junction to the disk member 31. The sample was measured as in Example 1. The light-transmitting layer had a thickness within the range of 98±1 μm, indicating a less radial thickness variation than in Example 1.

Comparative Example 1

An optical disk sample was fabricated as in Example 1 except that the plug means was not used and the resin was fed to the disk substrate at a radius of 19 mm. The sample was measured as in Example 1. The light-transmitting layer had a thickness within the range of 75±20 μm. The thickness difference between the inner and outer perimeters was as large as 40 μm.

Comparative Example 2

An optical disk sample was fabricated as in Comparative Example 1 except that spin coating was done at 800 rpm for 3 seconds. The sample was measured as in Example 1. The light-transmitting layer had a thickness within the range of 96±25 μm. The average between maximum thickness and minimum thickness of the light-transmitting layer within the measured region was approximately equal to Example 1, but the thickness difference between the inner and outer perimeters was as large as 50 μm.

Comparative Example 3

An optical disk sample was fabricated as in Example 2 except that the plug means was not used and the resin was fed to the disk substrate at a radius of 19 mm. The sample was measured as in Example 1. The light-transmitting layer had a thickness within the range of 60±17 μm. The thickness difference between the inner and outer perimeters was as large as 34 μm.

Japanese Patent Application No. 2000-174540 is incorporated herein by reference.

Reasonable modifications and variations are possible from the foregoing disclosure without departing from either the spirit or scope of the present invention as defined by the claims.

What is claimed is:

1. An method for preparing an optical information medium including a disk shaped supporting substrate having a center hole, an information recording layer on the substrate, and a resin based light-transmitting layer on the information recording layer by which a recording/reading laser beam is transmitted, the method comprising the steps of:

mounting the supporting substrate having the information recording layer borne thereon on a rotating table configured to hold and rotate the supporting substrate, closing the center hole of the supporting substrate with a plug device having a disk member configured to close the center hole and an integral support shaft extending from a center of the disk member of said plug means, feeding a coating fluid containing the resin from a feed device to an outer periphery of said support shaft and not to an interior portion of the support shaft, and then onto the disk member of said plug device, rotating said supporting substrate together with said plug device, whereby the coating fluid is spread from the disk member over the supporting substrate to form a resin layer, and curing the resin layer into the resin based light-transmitting layer.

* * * * *

UNITED STATES PATENT AND TRADEMARK OFFICE
CERTIFICATE OF CORRECTION

PATENT NO. : 6,689,415 B2
DATED : February 10, 2004
INVENTOR(S) : Komaki et al.

Page 1 of 1

It is certified that error appears in the above-identified patent and that said Letters Patent is hereby corrected as shown below:

<u>Title page,</u>
Item [75], should read:

-- [75] Inventors: Tsuyoshi Komaki, Tokyo, (JP);
Hideki Hirata, Tokyo, (JP); Kenji Yamaga, Tokyo, (JP) --

Signed and Sealed this

Eighteenth Day of May, 2004

JON W. DUDAS
*Acting Director of the United States Patent and Trademark Office*